(12) United States Patent
Satran et al.

(10) Patent No.: US 7,752,486 B2
(45) Date of Patent: Jul. 6, 2010

(54) RECOVERY FROM FAILURES IN A COMPUTING ENVIRONMENT

(75) Inventors: Julian Satran, Atlit (IL); John Lewis Hufferd, San Jose, CA (US); Kalman Meht, Netanya (IL)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 11/123,678

(22) Filed: May 5, 2005

(65) Prior Publication Data
US 2005/0273645 A1 Dec. 8, 2005

(30) Foreign Application Priority Data
May 7, 2004 (GB) ................................. 0410150.7

(51) Int. Cl.
*G06F 11/00* (2006.01)
(52) U.S. Cl. .......................................... 714/4; 709/227
(58) Field of Classification Search ..................... 714/4, 714/6; 709/227; 370/401; 710/15
See application file for complete search history.

(56) References Cited

U.S. PATENT DOCUMENTS

| | | | |
|---|---|---|---|
| 6,654,902 B1 * | 11/2003 | Brunelle et al. | ................. 714/4 |
| 7,111,084 B2 * | 9/2006 | Tan et al. | ....................... 710/15 |
| 2001/0018713 A1 * | 8/2001 | Kokado et al. | ............... 709/235 |
| 2003/0014526 A1 * | 1/2003 | Pullara et al. | ................ 709/227 |
| 2005/0138466 A1 * | 6/2005 | Spry | ............................. 714/6 |
| 2005/0157730 A1 * | 7/2005 | Grant et al. | .................. 370/401 |

OTHER PUBLICATIONS

"iSCSI: The Universal Storage Connection", John L. Hufferd, Addison Wesley, 2003, chapters 4,5,7,12.

* cited by examiner

*Primary Examiner*—Scott T Baderman
*Assistant Examiner*—Kamini Patel
(74) *Attorney, Agent, or Firm*—Michael J. Buchenhorner; Vazken Alexanian

(57) ABSTRACT

Methods for recovery from server-failures wherein servers control a communication initiator's access to a set of resources. A probable server failure leads to a communication initiator performing a discovery operation to identify available servers capable of accessing a required resource. A server checks whether any of the servers has failed. If a server has failed, a server other than the failed server sends the communication initiator an identification of the failed server together with a network address of an identified available server. The identified available server configures itself to respond to resource access requests directed to the failed server. The communication initiator establishes a connection to an available server enabling access to the required resource. The available server uses initiator-provided elements to recreate a reservation identifier, so that replacing server can also manage resources that were reserved by the failed server at the time of its failure.

23 Claims, 4 Drawing Sheets

RECOVERY FROM FAILURES IN A COMPUTING ENVIRONMENT

FIELD OF THE INVENTION

The present invention relates to methods, apparatus and computer programs for recovery from failures affecting server availability in a computing environment.

BACKGROUND OF THE INVENTION

Fault tolerance, including the ability to recover from failures, is essential to the efficient operation of many computer systems and system components. 'Failover' recovery is a backup operational mode in which the functions of a system component (such as a processor, storage device, server or database) are automatically taken over by secondary system components when the primary component suffers a failure or becomes unavailable for other reasons.

In the past, when all stored data was connected to individual server computers in very basic point-to-point configurations, any failure of a single server could make data access impossible until the server recovered. More recently, developments such as storage area networks (SANs) have enabled any-to-any connections between servers and data storage systems. A failed path between a server and a storage system may result from the failure of any component in the path, but redundant components and multiple connection paths are typically provided within a storage network to ensure that connectivity remains possible when one or more components or paths fail. Automatic failover recovery enables normal functions to be maintained despite the inevitability of failures affecting components of a computer system.

A possible failover recovery scheme for dealing with server failures is to employ server-redundancy, with a secondary server having full access to state information of a primary server so that the secondary server can continue processing of commands when the primary server fails. The secondary server is made aware of a communication-initiator's possible reservations of resources that were initially accessible via the primary server. However, there is a significant overhead associated with maintaining detailed server state information at other servers.

A failover recovery solution could entail a secondary server using an IP address take-over mechanism so that all future commands targeted at a failed primary server will be received and handled by the secondary server. Instead of maintaining detailed state information for the primary server at a secondary server, any pending command that was not completed can be allowed to timeout (in some environments). Such a solution would typically require a status-checking mechanism such as a 'heartbeat' mechanism for the secondary server to detect a failure of the primary server—in addition to the overhead of the IP address take-over mechanism. As well as these overheads, such a solution would not automatically deal with dangling reservations (described below) and so reservation information would have to be saved persistently by the primary server to enable that information to be retrieved during recovery of a failed server. In a simple implementation, each server could have a backup server performing heartbeats and able to perform IP address takeover operations, but doubling the number of servers for redundancy is an expensive option.

A dangling reservation exists when a communication-initiator client has reserved a resource (such as a storage device) for exclusive use, but the initiator is no longer able to access the resource due to failure of the server that executed the reservation. The initiator client is unable to cancel the reservation and this could render the reserved resource unusable by any clients—unless another server has some mechanism for taking over management of existing reservations.

SUMMARY OF THE INVENTION

The present invention provides methods, apparatus and computer programs for recovery from failures affecting server availability in a computing environment. In a first aspect of the invention, an example embodiment provides a failover recovery method for a computing environment in which a set of servers control access to a set of resources. A communication initiator accesses a required resource via one of the set of servers—referred to as the primary server. Following a failure of the primary server, the communication initiator initiates a discovery operation to identify a secondary server within the set of servers which is capable of handling the required resource access operations. One of the set of servers determines which server has failed—for example, checking the status of other servers in the set in response to a communication associated with the discovery operation. A secondary server then takes over resource access operations on behalf of the failed primary server. The take-over is achieved by sending to the communication initiator the name of the failed primary server and (associated with the primary server name) the IP address of a secondary server. This secondary server configures itself to respond to resource access requests which use the name of the failed primary server. The initiator connects to the secondary server, as if reconnecting to the primary server, and the initiator and secondary server continue resource access operations.

According to the first embodiment of the invention, a secondary server is able to take over the resource access operations of the failed primary server without requiring IP address takeover and without the overhead of sharing detailed state information between servers. Furthermore, the invention can be implemented without periodic heartbeat operations. For example, either a command timeout or a lack of response to a verification utility or command (NOP, ping, or similar) may be used as an indicator that a primary target server may have failed. The initiator responds to the command timeout or lack of response by initiating a discovery operation to identify available secondary servers—for example attempting to establish a discovery session with one of a set of peer servers of the primary target server. A secondary server for which a discovery session is established can then respond to the discovery operation to attempt communication with peer servers of the secondary server, thereby to determine whether a peer server has failed. The secondary server can then inform the initiator that requests using the name of a failed primary server should now be directed to the IP address of the secondary server.

The invention may be applied to failover recovery of iSCSI servers, where a primary target server provides access to storage devices for an iSCSI client (initiator) within a storage area network (SAN). In embodiments of the invention which are not iSCSI implementations, the discovery operation may be any operation to identify an available secondary server for handling resource access operations. Such a discovery operation may involve a specialized type of communication session, such as a discovery-specific or failover-specific session.

Another aspect of the invention provides an embodiment of a data processing apparatus, for use in a computing environment in which a set of servers control a communication initiator's access to a set of resources, the apparatus comprising: a data processing unit; a data storage unit; a first program for identifying an available server within the set of servers that is available to provide access to the set of resources; and a status verifier, controlled by the first program in response to a request from the communication initiator, for determining whether any of the set of servers has failed. The first program is responsive to a determination that a server has failed, for sending to the communication initiator an identification of the failed server together with and associated with a network address of the identified available server, and for initiating configuration of the identified available server to respond to resource access requests directed to the failed server.

BRIEF DESCRIPTION OF THE DRAWINGS

Embodiments of the invention are described below in more detail, by way of example, with reference to the accompanying drawings in which.

DETAILED DESCRIPTION OF THE INVENTION

Figure 1:
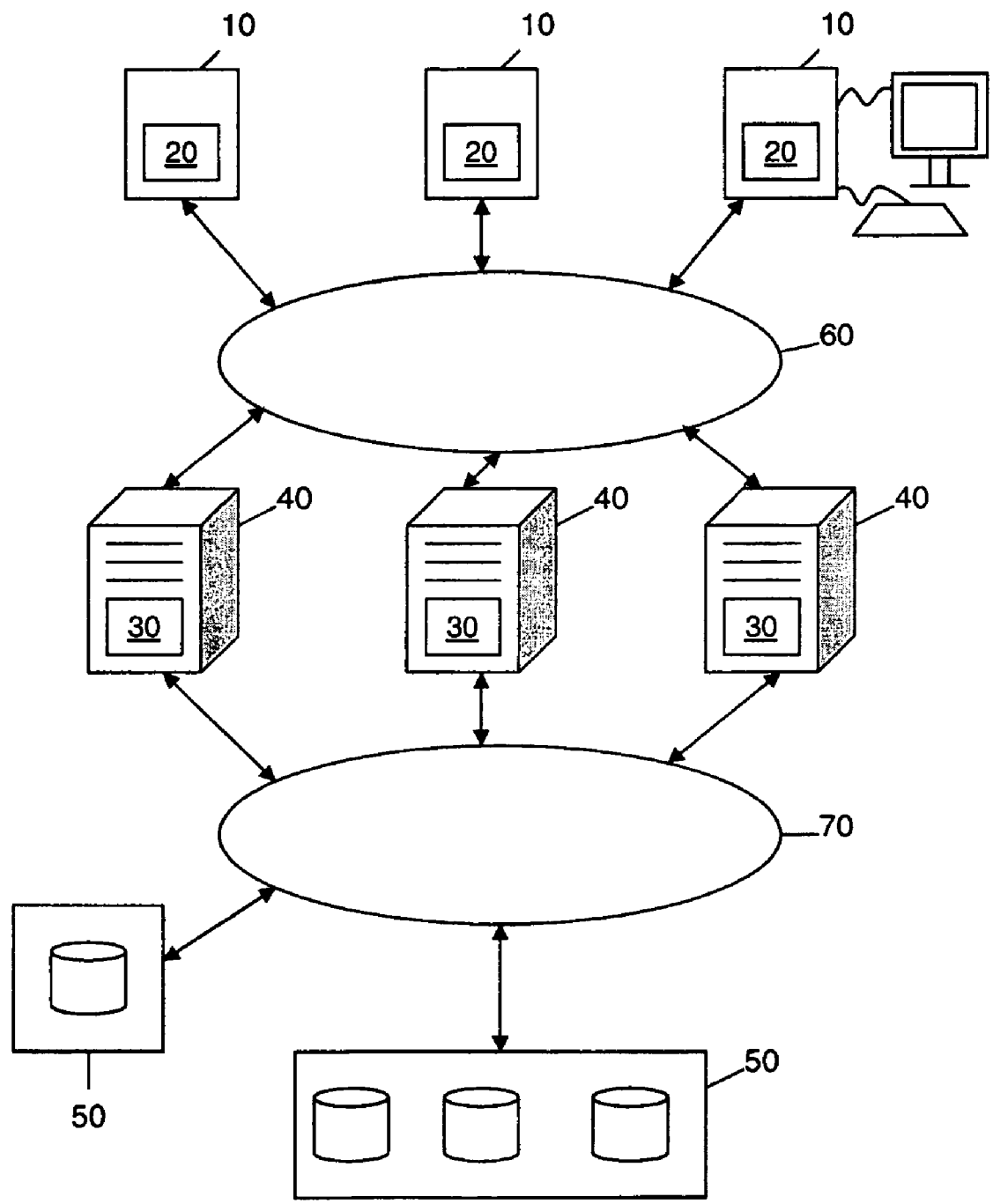
FIG. 1 is a schematic representation of a network in which a set of servers control client access to resources within a storage network.

The present invention provides methods, apparatus and computer programs for recovery from failures affecting server availability in a computing environment. A first embodiment of the invention provides a failover recovery method for a computing environment in which a set of servers control access to a set of resources. A communication initiator accesses a required resource via one of the set of servers—referred to as the primary server. Following a failure of the primary server, the communication initiator initiates a discovery operation to identify a secondary server within the set of servers which is capable of handling the required resource access operations. One of the set of servers determines which server has failed—for example, checking the status of other servers in the set in response to a communication associated with the discovery operation. A secondary server then takes over resource access operations on behalf of the failed primary server. The take-over is achieved by sending to the communication initiator the name of the failed primary server and (associated with the primary server name) the IP address of a secondary server. This secondary server configures itself to respond to resource access requests which use the name of the failed primary server. The initiator connects to the secondary server, as if reconnecting to the primary server, and the initiator and secondary server continue resource access operations.

The 'primary server' in this context is the server which initially provides access to the required resource. The network may be configured such that the primary server is explicitly defined as the default server for requests for access to a given resource, but the term 'primary server' also includes one of a set of redundant servers that is selected at run-time. The set of servers which are capable of providing access to the resource are referred to below as 'peer servers', referring to their common ability to handle resource access operations ('peer' in this context does not imply a limitation to a set of identical servers). A 'secondary server' is any server which is capable of handling the resource access functions of the primary server if the primary server becomes unavailable.

According to the first embodiment of the invention, a secondary server is able to take over the resource access operations of the failed primary server without requiring IP address takeover and without the overhead of sharing detailed state information between servers. Furthermore, the invention can be implemented without periodic heartbeat operations. For example, either a command timeout or a lack of response to a verification utility or command (NOP, ping, or similar) may be used as an indicator that a primary target server may have failed. The initiator responds to the command timeout or lack of response by initiating a discovery operation to identify available secondary servers—for example attempting to establish a discovery session with one of a set of peer servers of the primary target server. A secondary server for which a discovery session is established can then respond to the discovery operation to attempt communication with peer servers of the secondary server, thereby to determine whether a peer server has failed. The secondary server can then inform the initiator that requests using the name of a failed primary server should now be directed to the IP address of the secondary server.

The invention may be applied to failover recovery of iSCSI servers, where a primary target server provides access to storage devices for an iSCSI client (initiator) within a storage area network (SAN). If the primary server fails, the failure is identified (perhaps implicitly by a timeout) by the iSCSI initiator, and the initiator then requests an iSCSI Discovery-type session with a secondary iSCSI server within the SAN. The secondary server responds to the client initiator-requested discovery session by contacting its set of peer servers to identify the failed server and then taking over the failed server's storage device controller functions. Alternatively, a new type of Failover-type session may be defined as an extension to existing iSCSI capabilities.

In embodiments of the invention which are not iSCSI implementations, the above-referenced discovery operation may be any operation to identify an available secondary server for handling resource access operations. Such a discovery operation may involve a specialized type of communication session, such as a discovery-specific or failover-specific session.

An example embodiment of the invention for iSCSI failover recovery addresses dangling reservations by enabling a secondary iSCSI server which replaces a failed primary server to reproduce the reservation information of the primary server, without the need to share information from the failed server. An iSCSI initiator that reserved a storage device on the primary server is then able to continue to access the reserved device via the secondary server. When a storage device is reserved, a unique identifier is assigned and stored by the reserving iSCSI server. This identifier must be provided to gain access to the reserved device. To access devices reserved by a primary server, a secondary iSCSI server reproduces the same identifier information as was created by the primary server before it failed. This can be implemented by using a reservation-identification scheme in which unique identifiers are created from information which is available to the initiator even when the primary server has failed. For example, the reservation-identification scheme may create identifiers from the initiator name and/or a unique Initiator Session Identifier (ISID) assigned by the initiator. The name of the primary target server may be an additional input element. The initiator and/or ISID (and optionally the primary target server name) are provided to the new target (secondary server) during Login and this enables the new target to recreate the unique reservation identifier to allow the initiator to continue to exclusively access its reserved devices. There is no need for the reservation to be relinquished during the failover recovery operation.

In another example embodiment of the invention, the initiator requests a discovery session with a gateway server that provides access to a plurality of secondary servers (for example an iSCSI gateway providing access to a plurality of iSCSI device controllers). The gateway is contacted by the initiator to identify a list of target servers lying behind the gateway. The gateway may then facilitate direct connection between the initiator and a selected target server, or the gateway may act as a router and/or firewall between a front-end IP network (connecting client initiators to the gateway) and a backend network (connecting the gateway to the set of servers and then to resources such as storage devices). If one of the servers on the backend network fails, the gateway can reassign the identity of the failed server to itself or another back-end server that has access to the devices that were previously controlled by the failed server. The gateway then sends the IP address of the newly-assigned server and the identity of the failed server to the initiator, to induce the initiator to send future requests to the newly-assigned server. The gateway and newly-assigned server cooperate to reconfigure the newly-assigned server to handle requests that use the name of the failed server.

Methods as described above may be implemented via computer programs, using program code instructions to control the performance of operations of a data processing apparatus. Such computer programs may be made commercially available as program products comprising program code recorded on a recording medium, and may be available for download via a data transfer medium.

An example of an apparatus embodiment of the invention provides a data processing apparatus, for use in a computing environment in which a set of servers control a communication initiator's access to a set of resources. The apparatus comprising: a data processing unit; a data storage unit; a first program for identifying an available server within the set of servers that is available to provide access to the set of resources; and a status verifier, controlled by the first program in response to a request from the communication initiator, for determining whether any of the set of servers has failed. The first program is responsive to a determination that a server has failed, for sending to the communication initiator an identification of the failed server together with and associated with a network address of the identified available server, and for initiating configuration of the identified available server to respond to resource access requests directed to the failed server.

It is noted that a storage area network (SAN) is a special purpose network that interconnects data storage devices with associated data servers, providing high-speed data access for a wider network of users. SANs typically form part of the overall computing resources of an organization, with the servers and storage devices of the SAN often being clustered in close proximity to other computing resources such as mainframe computers. However, a SAN may also include components at remote locations—for example, using wide area network carrier technologies to access backup storage. SANs are known to support disk mirroring, backup and restore, archival and retrieval of archived data, and the sharing of data among different servers in a network.

A storage area network (SAN) may use one or a plurality of different communication technologies, such as iSCSI or Fiber Channel technology. Fiber Channel is a technology for transmitting data between computer devices, currently at data rates above 1 Gbps, and is especially useful for connecting server computers to shared storage devices and for interconnecting storage controllers and drives. Fiber Channel over IP (FCIP) translates Fiber Channel control codes and data into IP packets for transmission between geographically-separated Fiber Channel SANs.

The Internet Small Computer System Interface (iSCSI) protocol is an alternative IP-based storage networking standard for linking data storage facilities—such as within a SAN or linking SANs across a Wide Area Network (WAN). iSCSI provides important support for development of SAN solutions by increasing the distance capabilities and price-performance of storage data transmission. The SCSI interfaces enable services to be requested from I/O devices including hard drives, tape drives, DVD and CD drives, printers and scanners. By carrying SCSI commands (in SCSI-defined Command Descriptor Blocks) and data over IP networks, iSCSI is used to facilitate data transfers over Intranets and to manage storage over large distances. iSCSI is described in detail in "iSCSI: The Universal Storage Connection", John L. Hufferd, Addison Wesley, 2003 and in the IETF IP Storage Working Group's Internet Draft draft-ietf-ips-iscsi-20.txt, "iSCSI", 19 Jan. 2003, Julian Satran et al (referred to herein as "the iSCSI specification").

The following is a brief summary of how iSCSI works. When an end user or application at an iSCSI initiator node (the iSCSI client) sends an I/O request, the operating system generates SCSI commands with corresponding data (in a Write operation, but not in a Read operation for example). The generated commands and data are encapsulated—an iSCSI packet header is added—followed by encryption if necessary. The resulting IP packets are transmitted over an IP connection (e.g. over Ethernet, or some other physical transport) to an iSCSI target node (iSCSI server). When a packet is received, encrypted packets are decrypted and then disassembled—separating the SCSI commands from the data. The SCSI commands are sent to a target SCSI storage device. Responses to the original request are returned to the initiator by the iSCSI target, also using the iSCSI protocol.

Described below is an example implementation of the present invention in a failover recovery solution for iSCSI, which enables efficient take-over of the functions of a failed server and addresses the problem of how to handle a failed-server's dangling reservations.

An iSCSI initiator (client) may be a standard network-connected computer, except that an iSCSI client uses the iSCSI protocol to access storage devices that are located across a TCP network. The iSCSI client comprises a processor, memory, communication ports, installed programs and may or may not have disks or other storage devices physically connected to it.

The iSCSI client accesses its iSCSI storage devices over the TCP network. The iSCSI client's storage devices are managed by the iSCSI targets (servers). These storage devices are typically connected to the iSCSI target, and are accessible only through the iSCSI target. The iSCSI target can be implemented in various ways, but a typical iSCSI target node has the standard components of other computers (one or more processors, system memory, communication ports, installed program code, etc.). The ISCSI target may also have special hardware particular to storage controllers and other similar devices. Both the initiator and the target may use special hardware such as a Host Bus Adapter (HBA) to interface the I/O over the physical transport. The HBA typically performs the protocol specific (iSCSI or FCP) functions, and the HBA typically consists of an embedded processor, on-card memory, ports, and possibly some protocol-specific hardware.

FIG. 1 shows an example network in which a number of client data processing systems 10 include iSCSI initiator nodes 20 (referred to hereafter as "initiators" or "communication initiators"). The iSCSI initiators at the clients connect to iSCSI target nodes 30 (hereafter "targets" or "servers") at one of a number of iSCSI server computers 40 to access a storage device 50. The iSCSI targets may include intermediary iSCSI gateway servers and iSCSI storage controllers. The targets 30 and the initiators 20 are connected via a TCP/IP network 60, and the iSCSI targets are TCP/IP communication endpoints that understand iSCSI packets. There may be many physical storage devices 50 managed by the same iSCSI target 30, and a number of targets 30 may be configured to access the same storage devices 50 via a storage area network (SAN) 70 such as a backend FiberChannel storage network or Loop, or a common SCSI bus. The SAN 70 may include a number of interconnected switches providing redundant paths between the iSCSI targets 30 and the storage devices 50. Although there may be one or more iSCSI nodes at a client or server system, FIG. 1 and the following description assumes a one-to-one correspondence for simplicity.

Each target 30 is configured with a globally unique identifier, and may be configured to recognize the names and IP addresses of each of this target server's set of peer target servers. The set of peer target servers comprises the target servers which are capable of handling data access requests for a specific set of data storage devices. Each new communication session between an initiator and a target server is assigned a unique Session Identifier (SSID) which is stored at the initiator and the target server. Each initiator explicitly specifies a unique initiator session ID (ISID) at session establishment, and the SSID is created using this initiator session ID (ISID) and a target ID that is provided by the target during session establishment.

The target servers are not required to maintain detailed state information for other target servers. In some embodiments, an iSCSI initiator may be statically configured to use a predefined globally unique identifier of a respective primary server for accessing a pool of iSCSI storage devices. Alternatively, a primary server may be identified by querying an iSNS name server (or some other centralized registry with which target servers register), or via a multicast Service Location Protocol (SLP) request. Each target server may be configured to listen on a specialized communication port for discovery operation requests, and then the initiator sends a multicast message onto the network asking all servers listening on the specialized communication port to respond.

In general, several discovery mechanisms are known to help locate servers of various services within computer networking environments, and typical mechanisms involve identifying a discovery server which is then used to identify one or more specific servers to manage data access operations. A selection can be made from the discovered set of servers, using known techniques (techniques such as first responder, random choice among responders, round-robin, shortest path).

The information available from known discovery mechanisms typically includes the names of the available targets and their addresses. Several gateway targets may respond to the same target name, indicating that they handle the same set of storage devices, while being differentiated by their IP addresses. The initiator, in this example, may be configured with an identification of multiple paths to each of a set of storage devices to allow for path failures.

The iSCSI specification defines two different types of session that may be established between an ISCSI initiator and an iSCSI target server. The first type is a Normal-type communication session, which may include one or more TCP/IP connections for data transfer between the initiator and target server. The second type of session is a Discovery-type session, which is used by an initiator for locating available target servers within a SAN. In a Discovery session, a single TCP/IP connection is established between the initiator and a "discovery target", and the session is specified to be a Discovery session in the session-establishing login request. The initiator issues a SendTargets command to obtain from the discovery target a list of other targets to which the initiator may connect. After receiving the list of other targets, the Discovery session is terminated. The initiator can then open Normal sessions with any of the discovered targets.

Figure 2:
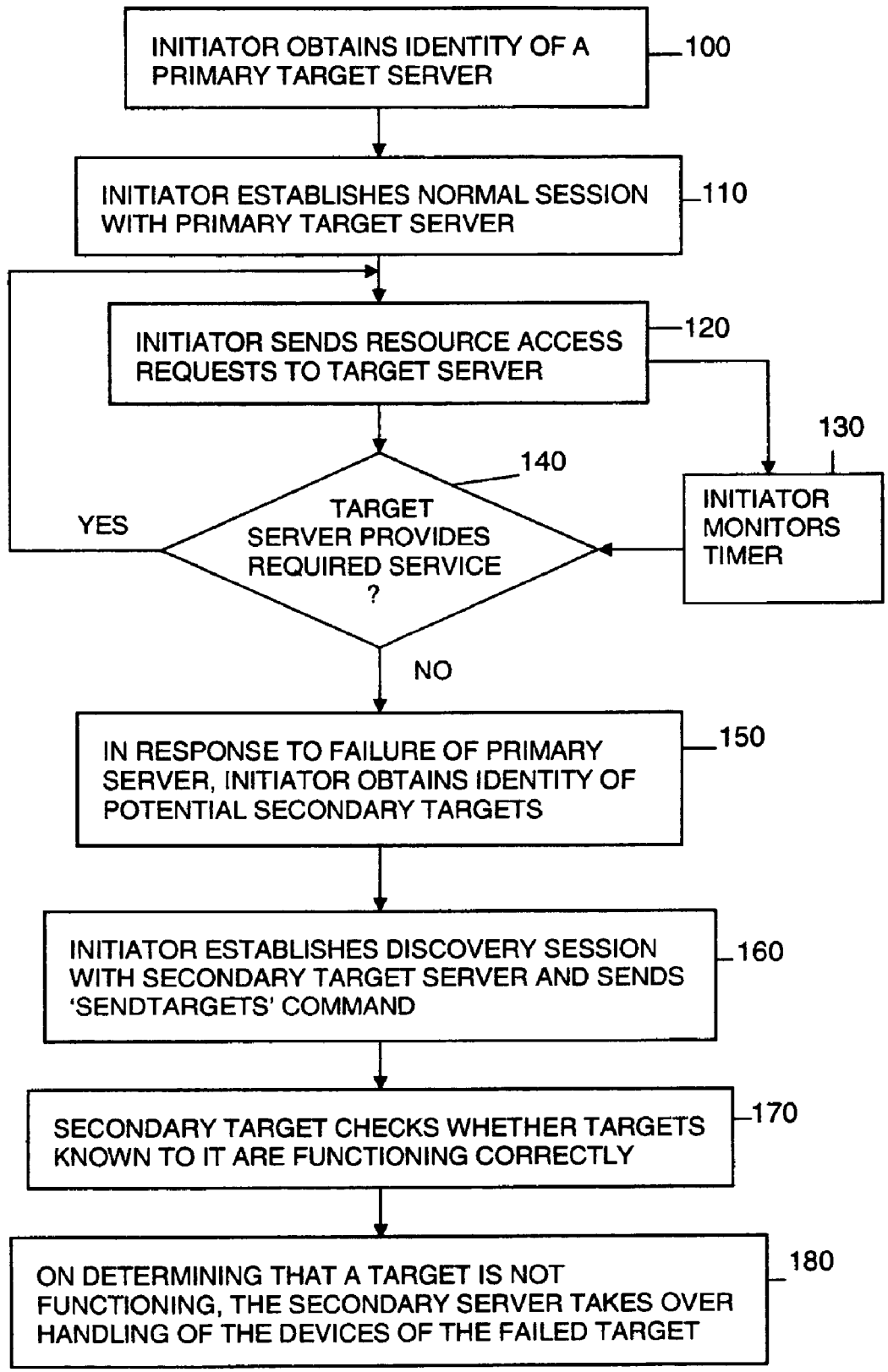
FIG. 2 shows the steps of a failover recovery method according to an embodiment of the invention.

A sequence of steps of a failover recovery method, according to an example embodiment of the invention, is described below with reference to FIG. 2 and FIG. 3. According to the method, a server is prompted to check for a failed peer server upon receipt of a request for a discovery operation. This approach of responding to a specific trigger event avoids the need to constantly and proactively poll the status of all servers. Then a secondary server masquerades as the failed server to achieve failover recovery—without the overhead of IP address takeover.

One of the discovery methods described previously is used to identify a server or list of servers that may be able to provide a required service to the initiator. If a list is obtained, a specific target server is selected from the list. Using the particular process described above, a "discovery target server" is first identified by manual configuration, or via a SLP request or an iSNS query. The "discovery target server" is a server that is identified for the specific purpose of identifying a target server to provide a required service—such as to manage a required data access. The discovery target server is then used to identify a set of available servers from which a specific selection can be made, as described below.

The initiator can issue a Login request to connect to the discovery target, requesting a Discovery-type session for the purpose of discovery 100 of a suitable target server. The initiator issues a SendTargets command to the discovery target. The discovery target returns to the initiator a list of names and addresses of the target servers that are known to the discovery target and to which the initiator can attempt to connect. The discovery target may list itself as one of the possible targets to which the initiator may connect. The initiator then establishes 110 a connection to one of the targets in the list of discovered targets—referred to below as the primary target server. The initiator can now send 120 resource access requests to the selected target server, and the target server provides access to its storage devices 50 to service 140 the requests.

Figure 3:
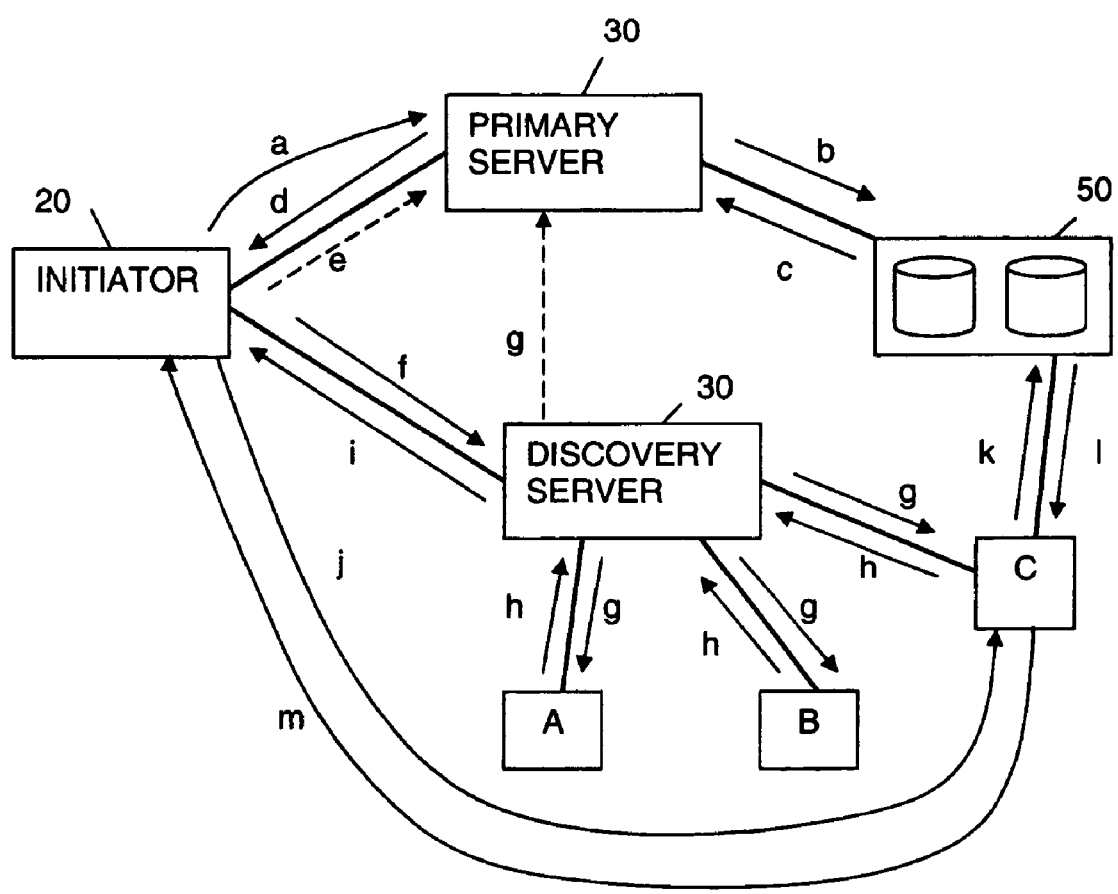
FIG. 3 shows a flow of communications within a network according to an embodiment of the invention.

FIG. 3 shows a first communication, a, between an initiator 20 and an iSCSI target node 30 which is the primary server for a required storage device 50. The primary server may be identified simply by reference to predefined configuration information of the initiator, or using known discovery methods as described above. The primary server passes (step b) the request to the connected storage device 50, which performs a read, write or other processing operation as requested. The storage device 50 returns a response (including, for example, requested data or a confirmation of a data update) to the initiator 20 via the primary server 30 (steps c, d). Let us now assume that, subsequent to receipt by the initiator of a reply to the first communication, the primary server experiences a failure. A further request, e, is sent from the initiator to the primary server.

The initiator monitors 130 a time delay from the sending of an iSCSI request to the primary target server. If no response is received within a predefined time period (as shown at step 140 in FIG. 2), the initiator determines that the primary server may have failed.

In one embodiment, the initiator's reaction to this timer expiry is to attempt to establish a discovery session with the known primary server. This serves to confirm whether the primary server has failed, since a failure to establish the discovery session implies that the primary server is unavailable to the initiator. In other embodiments, a command timeout and/or no response from a NOP command is deemed sufficient to justify replacing the primary server with a secondary server.

In either of the described alternative embodiments, the initiator detects that its target has not responded appropriately and responds by initiating a new discovery operation 150. As described above, the first step of this discovery operation may use one of a number of known techniques—such as querying an iSNS name server or performing a multicast SLP request to identify a set of possible target servers to which the initiator can attempt to establish connections. There is no guarantee at this stage that the initiator will succeed to connect to a specific one of the listed targets, or that there are any relevant devices connected to a specific listed target. The listed targets may be inactive at the time the initiator tries to connect. The list of targets may have been generated manually and may remain static, without updated knowledge of the state of the listed targets.

As in the earlier step of identifying a primary target server, a first target identified by one of the known discovery mechanisms is used as a discovery server. That is, the initiator requests 160 a Discovery-type communication session with one of the servers that is identified in the first part 150 of the discovery operation. As defined in the iSCSI specification, requesting a Discovery session involves sending a Login request (step f in FIG. 3) specifying that the required session type is a Discovery-type.

If a connection is successfully established, the initiator sends 160 an iSCSI SendTargets command to the discovery target (also represented by step f in FIG. 3), to request that the discovery target returns a list of targets known to the discovery target that control access to devices accessible to the initiator (i.e. a set of peer servers). The discovery target checks 170 that the known targets are functioning properly. The discovery target is, in the present embodiment, configured to know the name and address of each of its set of peer servers and so the discovery server can request (step g) a connection with each peer server to determine the status of each peer server.

If one of the targets is not functioning properly, the discovery target takes action 180 to provide for a secondary target to act as a backup server and take over resource access operations that would have been handled by the failed target. This backup server may be the discovery target itself, or another server (A, B or C) within the set of target servers.

The discovery target responds to this establishment of a Discovery-type session followed by the identification of a failed target server, by sending to the initiator a reply (step i) specifying the name of the failed target server and the address of a secondary target (possibly itself) that will take over the handling of storage access operations for the storage devices of the failed target server.

In the present embodiment, a single secondary target address (of server C) is specified—avoiding the need for a further selection step by the initiator and allowing the secondary server to reconfigure itself to handle the failed server's storage access requests without having to await a confirmation from the initiator of which secondary server has been selected. This reconfiguration of the secondary server does not require IP address takeover, but configuring the secondary server to respond to the server name or equivalent identifier originally used for communications with the primary server.

In other embodiments, if a plurality of secondary target servers are specified to the initiator, the initiator selects a specific one of the secondary servers and the selected one of the secondary servers reconfigures itself to handle received requests that use the name of the failed server.

The initiator 20 then closes the Discovery session with the discovery target 30, and establishes a Normal-type communication session (step j) with the secondary server. This involves the initiator requesting a Login to the secondary server, specifying the required session type as Normal and using the name of the failed primary server together with the address of the secondary server. By the secondary target server configuring itself to handle such Login requests and subsequent storage access requests using the name of the failed server, and notifying the initiator of the 'new' IP address to be associated with the name of the failed primary server, the secondary server has taken over the identity and responsibilities of the primary server for future communications.

Since the initiator 20 connects directly to the secondary target server, C, using the target name of the primary server, the initiator can interact with the secondary target server as if communicating with the primary server. In particular, the initiator performs a login operation with the secondary server, using the original Initiator Session Identifier (ISID), to perform the type of data access functions that were interrupted when the primary server stopped responding. The secondary target, C, accesses its storage device 50 (steps k,l) in response to request j and returns a confirmation or required data to the initiator (step m).

This take-over of responsibility for requests that would have been handled by the primary server is achieved without IP address takeover and can be achieved without performing heartbeat checks. Continuous performance of heartbeat checks or similar status checks is avoidable because, according to the embodiment described above, checks of server status are performed only in response to specific trigger conditions that indicate a possible failure of a primary server. The trigger conditions of the above-described embodiment are receipt of a request for a discovery operation. If the secondary server determines that the primary target has failed, the secondary server replies to the initiator's request for a discovery operation by sending the name of the failed primary target server matched with the IP address of the new target server.

In an alternative embodiment of the invention, a new session type is defined as an extension to the capabilities of existing iSCSI implementations. This new session type is referred to hereafter as a Failover-type session. This involves adding a new value to the set of allowable values for the session type key—extending the iSCSI definition. The initiator responds to conditions indicating a possible server failure (such as a timeout or lack of response to a NOP or ping or similar verification command or utility) by requesting a Failover type session with a server. The particular server may be identified in one of the known ways described above, and the steps of checking for failed servers and other steps to take over operations of a failed server may be performed in the same way as described above in the context of a Discovery-type session. To trigger performance of failover recovery operations by a failover session request, a small modification is required to the behavior of initiators to generate the failover request. However, such an embodiment has the advantage of not requiring additional processing to be performed in response to every request for a discovery session. This embodiment is an example of a new approach which, in general terms, achieves processing efficiency by reducing the times that server status is checked to only those specific times that an initiator sends a failover indication.

Figure 4:
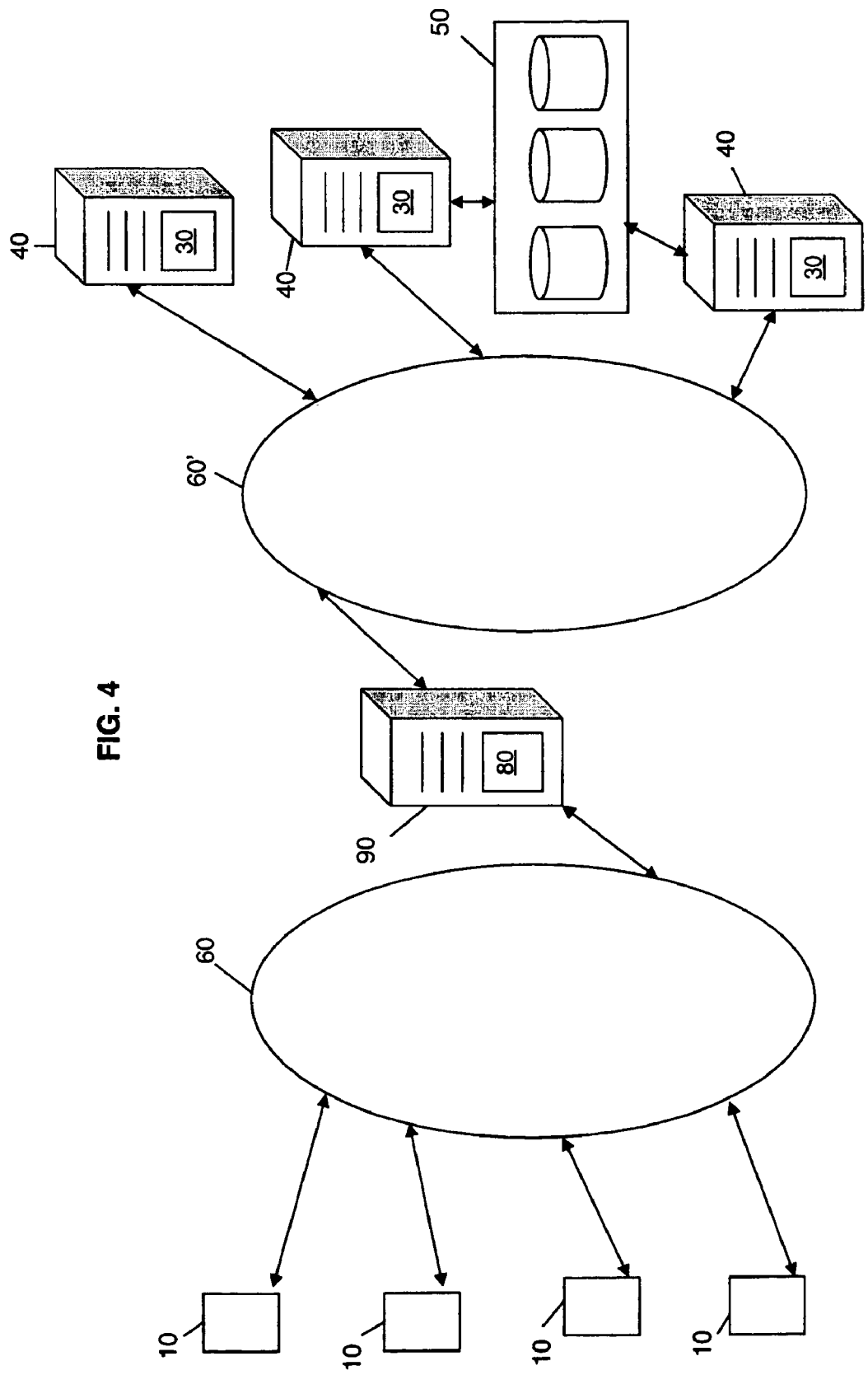
FIG. 4 is a schematic representation of a network in which a number of client computer systems connect to an iSCSI gateway via a front-end IP network client, and the gateway connects to a set of iSCSI servers and connected storage devices via a backend IP network.

As noted above, a discovery server may be any one of a set of iSCSI storage controllers which is capable of functioning as a secondary server when a primary server fails. Alternatively, the discovery server may be an intermediary gateway server providing access to a plurality of iSCSI storage controllers. FIG. 4 shows an iSCSI gateway server and router 80 installed on a server system 90 positioned between the client systems 10 and back-end server systems 40. The initiators 20 running on the client systems are initially configured to only know the identity of the gateway 80. An initiator 20 at a client system 10 opens a Discovery-type session with the gateway 80. The gateway returns a list of targets 30 that sit behind the gateway and to which any initiator may connect. The gateway may then act as a router (and/or a firewall), with the clients 10 and a front-end IP network 60 on one side, and on the other side a back end network 60' connecting the server systems 40 to the gateway 80. If one of the servers connected to the back-end network fails, the gateway can reassign the identity of the failed server to itself or to another server connected to the back-end network that has access to the devices previously controlled by the failed server.

The above-described solutions provide for efficient take over of the functions of a failed server as part of a failover recovery solution. However, the above description of failover solutions has not addressed the problem of how to resolve dangling reservations when a server fails. A problem arises where a communication initiator has reserved a resource for exclusive use, and the reservation has been obtained via a particular server that has subsequently failed. The secondary server may require information from the failed server to access the reserved resource, such that no initiator nor server can access the resource until full recovery of the failed server. This situation is unacceptable in many computing applications where constant availability is required.

Described below is a solution for handling dangling reservations, which is complementary to the above-described failover recovery schemes. The solution is described in the context of an iSCSI implementation, by way of illustration.

When a communication initiator asks to reserve a device, a target server controlling access to the device assigns a reservation identifier and returns the identifier to the initiator. The initiator must then provide the reservation identifier on each request to access the reserved device. Other initiators do not know the reservation identifier and are thus blocked from accessing the reserved device. In typical implementations, the target is responsible for the task of enforcing access to the reserved device. The target manages the device and has free access to it, and does not require a reservation identifier in order to access the device. The target examines the provided reservation identifier to determine whether the identifier is valid for the requesting initiator to access the specified device. Upon recovery, the initiator still holds on to the old reservation identifier. The new target needs a way to ensure that the reservation identifier provided by the initiator is valid and that the initiator may in fact access the device. This is achieved by each target server using the same algorithm to generate/compute reservation identifiers based on information relating to the specific initiator.

In a particular embodiment, in order to handle dangling reservations and allow the initiator to continue accessing a reserved storage device, the original reservation information is recreated by a secondary iSCSI server when taking over from a failed primary server. With each reservation of a device by a primary server, a unique reservation identifier is assigned and stored by the reserving server. This identifier must be provided to gain access to the reserved device. To access devices reserved by a failed primary server, a secondary iSCSI server which replaces a failed primary server reproduces the same reservation identifier information as was created by the primary server. This is achieved in the present embodiment by implementing a reservation identification scheme which combines a target server name with the unique initiator-provided session identifier (ISID) to generate a reservation identifier, and then using the returned identification of the failed primary target with the unique initiator session identifier (ISID) obtained from the initiator.

The initiator's ISID and failed target name are provided to the new target (secondary server) and this enables the new target to recreate the unique reservation identifier to allow the initiator to continue to exclusively access its reserved devices. Since the existing reservation is then reused by the new target, there is no need for the reservation to be relinquished during the failover recovery operation and there is no need for the secondary server to have shared reservation details prior to the take-over operation.

It will be understood by persons skilled in the art that various modifications may be made to the above-described scheme for generating reservation identifiers that can be recreated when a secondary server takes over from a primary target server. For example, dangling reservations may be handled by use of a reservation identification scheme which combines the name of the initiator with the initiator-assigned ISID.

As noted previously, in addition to the above-described iSCSI-specific embodiments of the invention using known iSCSI Discovery-type sessions and the alternative of a Failover-type session, the present invention may be applied to other computing environments in which a plurality of servers control access to a set of resources and failover recovery is required. The terms 'communication initiator', 'client' and 'server' as used in this specification are intended to include such other environments.

The invention may be used in an environment in which multiple peer servers can manage the same set of resources. A trigger is defined to initiate a check for failed peer servers, and identification of a failed primary server prompts a secondary server to take over the identity of the failed server. In the iSCSI environment, this can be achieved by an extension of the existing discovery mode to serve as a trigger. In an alternative embodiment which uses a newly-defined Failover mode, a request for a Failover session can be used as the trigger. In other environments, such as a cluster of servers, an alternative trigger may be defined to prompt a peer server to check for a failed server and to take over its operations.

In one iSCSI implementation, no change is needed to the initiator since mechanisms are already defined by the iSCSI specification. In one such implementation, the initiator communicates with the secondary server as if the initiator is still communicating with the primary server. Alternatively, such as in a FiberChannel implementation, changes to the initiator may be appropriate. In a clustered file server environment that allows requests for exclusive use of a file (i.e. allows reservations), a trigger (or a heartbeat) is required to identify when one of the servers of the cluster has failed, for a peer server to detect and take over from the failed server. The above-described mechanism for reproducing reservation identifiers may then be used.

Other modifications and embodiments may be provided within the scope of the present invention. For example, FIG. 2 shows a loop to represent the initiator sending a request to a target and a target responding to the request. A timer is set by the initiator to monitor whether the target responds within a reasonable time period. The initiator may send multiple requests to the target before receiving a response. Responses for requests may come back in any order—not necessarily the order in which the requests were issued. Each command typically requires separate monitoring of a timer to determine whether a response to the command arrived as expected, or some other mechanism may be used to detect when a response fails to arrive for a particular request within a specified time period after the request was issued.

Additionally, FIGS. 1 and 4 show two networks: a data network and a separate storage network. It will be clear to persons skilled in the art that these networks may be combined into a single network in some embodiments, since iSCSI can be used both for the data traffic (between client and server) and the storage traffic (between the server and the storage devices).

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—STOP when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A recovery method, said method comprising:

controlling, with a set of servers, access to a plurality of resources, wherein each server within the set of servers is configured to know a name and address of its peer servers, wherein said peer servers are those servers capable of handling resource access functions of a primary server if said primary server becomes unavailable, and wherein said primary server is the server that initially provides access to the resource;

receiving a request from a communication initiator, requesting access to at least one of the resources;

assigning a primary server to handle the access request;

assigning a unique reservation identifier to the access request for storing by the primary server;

wherein said unique reservation identifier must be provided to gain access to the at least one of the resources;

wherein the unique reservation identifier comprises a target server name with a unique initiator-provided session identifier;

following a failure of the primary sewer, receiving a request for a discovery operation from the communication initiator, said discovery operation attempting to identify a peer server that is capable of handling the access request;

wherein checks of peer server status are performed by the communication initiator only in response to specific trigger conditions that indicate a possible failure of the primary server;

determining which server failed by checking a status of the peer servers, responsive to the discovery operation; and assigning a secondary server to take over resource access operations on behalf of the primary server by:

reassigning an identity of the primary sewer to the secondary server such that the secondary server reconfigures itself to respond to the resource access requests directed to the primary server; and sending to the communication initiator an identification of the failed server in association with a network address of the secondary server, such that the communication initiator is able to interact with the secondary server as if communicating with the primary server, by using the target name of the primary sewer and a session identifier;

wherein the second server reproduces the unique reservation identifier by combining the failed target server name with the unique initiator-provided session identifier.

2. The recovery method of claim 1, wherein the communication initiator is an iSCSI initiator node and the set of servers comprise iSCSI target nodes, and wherein the request for the discovery operation is a request for an iSCSI discovery session between the initiator and a peer server within the set of servers.

3. The recovery method of claim 1, wherein the set of resources comprise storage devices.

4. The recovery method of claim 1, wherein the request for the discovery operation is sent to a gateway server and the gateway server performs the discovery operation to identify the server, within the set of servers, that is available to provide access to the required resources.

5. The recovery method of claim 1, wherein the request from the communication initiator is a request for a failure recovery operation that is generated in response to the specific trigger conditions indicating the server failure.

6. The recovery method of claim 5, wherein the request from the communication initiator is sent to a server within the set of servers to initiate discovery of an available server.

7. The recovery method of claim 5, wherein the communication initiator is an iSCSI initiator node and the set of servers comprise a set of iSCSI target nodes, and wherein the request for a failure recovery operation is a request for a failover-specific communication session between the initiator and one of the set of servers.

8. The recovery method of claim 5, wherein the request for a failure recovery operation is sent to a gateway server and the gateway server performs the discovery operation to identify the server, within the set of servers, that is available to provide access to the required resources.

9. The recovery method of claim 1, further comprising a first server within the set of servers performing the following steps to determine whether the primary server within the set of servers has failed:

receiving the request from the communication initiator;

responding to the received request by sending a status verification query to each of the peer servers;

checking for receipt of a response to the status verification query; and identifying any of the peer servers for which no positive status verification is received.

10. The method of claim 1, further comprising managing resource reservations by the steps of:

a respective reserving server within the set of servers assigning a reservation identifier when reserving a resource within the set of resources, the reservation identifier being generated by combining data elements that are available to the initiator;

the identified available server responding to a determination that a reserving server has failed by obtaining said data elements from the communication initiator; and the identified available server combining said data elements to regenerate the reservation identifier, thereby to enable access to the reserved resource.

11. The method of claim 10, wherein the data elements comprise a session identifier.

12. The method of claim 11, wherein the session identifier is an initiator-assigned session identifier which is unique among session identifiers assigned by the communication initiator.

13. The method of claim 11, wherein the data elements further comprise an identifier of at least one of the communication initiator and the primary server.

14. A recovery method, comprising:

controlling, with a set of servers, access to a plurality of resources, wherein each server within the set of servers is configured to know a name and address of its peer servers, the step of controlling comprising the steps of:

receiving a request from a communication initiator, requesting access to at least one of the resources;

assigning a primary server to handle the access request, comprising assigning a unique reservation identifier and storing said unique reservation identifier;

starting a timer when assigning the request for access to the at least one of the resources;

monitoring for expiry of the timer before receipt of a response from the primary server;

in response to expiry of the timer before receipt of the response from the primary server, sending to a second server within the set of servers a request for discovery of a server that is available to provide access to the resource; and in response to receipt of an identifier of a failed primary server associated with an IP address of the second server that is available to provide access to the required resource, configuring the communication initiator to send to the second server future requests directed to the primary server for access to the resource;

wherein the second server reproduces the unique reservation identifier by implementing a reservation identification scheme that combines the failed primary server name with a unique initiator-provided session identifier.

15. The recovery method of claim 14, for use in an environment in which a resource-reserving server assigns a reservation identifier for a reserved resource, further comprising the resource-reservation management step of:

in response to a determination that a resource-reserving primary server has failed, and in response to the identification of the secondary server that is available to provide access to the required resource, the communication initiator providing data elements to the secondary server which data elements are sufficient to enable the secondary server to regenerate a reservation identifier assigned by the primary server.

16. A data processing apparatus comprising:

a data processing unit enabling a computing environment in which a set of servers control a communication initiator's access to a plurality of resources, wherein each server within the set of servers is configured to know a name and address of its peer servers;

a data storage unit coupled to said data processing unit;

a first program embodied in said data processing unit for identifying an available server within the set of servers that is available to provide access to required resources; and assigning a primary server to handle the access, said assigning comprising assigning a unique reservation identifier and storing said unique reservation identifier;

a status verifier, controlled by the first program in response to a request from the communication initiator, for determining whether the primary server within the set of servers has failed;

wherein the first program is responsive to a determination that the primary server within the set has failed, and wherein the first program assigns a secondary server to take over the resource access operations on behalf of the primary server by sending to the communication initiator an identification of the failed server associated with a name of the primary server, and a network address of the secondary server, and initiating configuration of the secondary server to respond to resource access requests sent to the primary server which requests include an identifier of the primary server;

wherein the secondary server reproduces the unique reservation identifier by implementing a reservation identification scheme that combines the failed primary server name with a unique initiator-provided session identifier.

17. The apparatus of claim 16, wherein the first program is adapted to implement the iSCSI protocol and the peer servers comprise iSCSI target nodes implementing the iSCSI protocol.

18. The apparatus of claim 16, comprising an iSCSI gateway for communicating with the set of servers using the iSCSI protocol, wherein the peer servers comprise iSCSI target nodes.

19. The apparatus of claim 17, wherein the apparatus comprises a server within the set of servers.

20. A data processing apparatus comprising:
   a data processing unit forming a client system in a computing environment in which a set of servers controls a client communication initiator's access to a plurality of resources;
   a data storage unit coupled to said data processing unit; and
      a communication initiator component for controlling the data processing apparatus to implement recovery-related steps of:
      assigning a primary server to handle the access request, comprising assigning a unique reservation identifier and storing said unique reservation identifier;
      starting a timer when sending, from the communication initiator to a primary server within the set of servers, a request for access to a required resource;
      monitoring for expiry of the timer before receipt of a response from the primary server;
      in response to expiry of the timer before receipt of a response from the primary server, sending to a second server within the set of servers a request for discovery of a server that is available to provide access to the required resource; and
      in response to receipt of an identifier of the primary server associated with an IP address of the second server that is available to provide access to the required resource, configuring the communication initiator to send to the second server future requests for access to the required resource directed to the primary server by using the target name of the primary server and the unique reservation identifier;
      wherein the second server reproduces the unique reservation identifier by implementing a reservation identification scheme that combines the failed primary server name with a unique initiator-provided session identifier.

21. The data processing apparatus of claim 20, comprising an iSCSI initiator node.

22. A computer program product, comprising program code recorded on a computer readable storage medium, for a recovery method, the recovery method comprising:
   controlling, with a set of servers, a communication initiator's access to a plurality of resources, wherein each server within the set of servers is configured to know a name and address of its peer servers, and
   controlling operations of a data processing apparatus on which the program code executes, the step of controlling the communication initiator's access comprising the steps of:
   in response to a request from a communication initiator, determining whether any of the set of servers has failed and identifying a primary server within the set of servers which is available to provide access to the set of resources;
   assigning the primary server to handle the access request, comprising assigning a unique reservation identifier and storing said unique reservation identifier;
   responding to a determination that the primary server failed by:
      reassigning an identity of the primary server to a secondary server such that the secondary server is able to reconfigure itself to respond to the access requests directed to the primary server; and
      sending to the communication initiator an identification of the primary server associated with a network address of the secondary server, such that the communication initiator is able to interact with the secondary server as if communicating with the primary server; and
   initiating configuration of the secondary server to respond to resource access requests sent to the primary server which requests include an identifier of the failed server;
   wherein the secondary server reproduces the unique reservation identifier by implementing a reservation identification scheme that combines the failed primary server name with a unique initiator-provided session identifier.

23. A computer program product comprising program code recorded on a computer readable storage medium, for a recovery method, the program code comprising code controlling the operations of a data processing apparatus on which the program code executes to perform within a computing environment in which a set of servers control a communication initiator's access to a set of resources employing:
   a first program for identifying a primary server within the set of servers that is available to provide access to the set of resources, wherein said primary server is the server that initially provides access to the resource; and
   a status verifier, controlled by the first program in response to a request from the communication initiator, for determining whether any of the set of servers has failed;
   wherein the first program responsive to a determination that the primary server has failed, checks status of the servers within the set of servers only in response to specific trigger conditions that indicate a possible failure of the primary server; and
   sends to the communication initiator an identification of the primary server associated with a network address of a secondary server, and to initiate configuration of the secondary server to respond to resource access requests sent to the primary server which requests include an identifier of the primary server.

* * * * *